Aug. 30, 1938.　　　　F. A. FAUST　　　　2,128,406
AUTOMATIC CONTROL SYSTEM
Filed Aug. 13, 1936
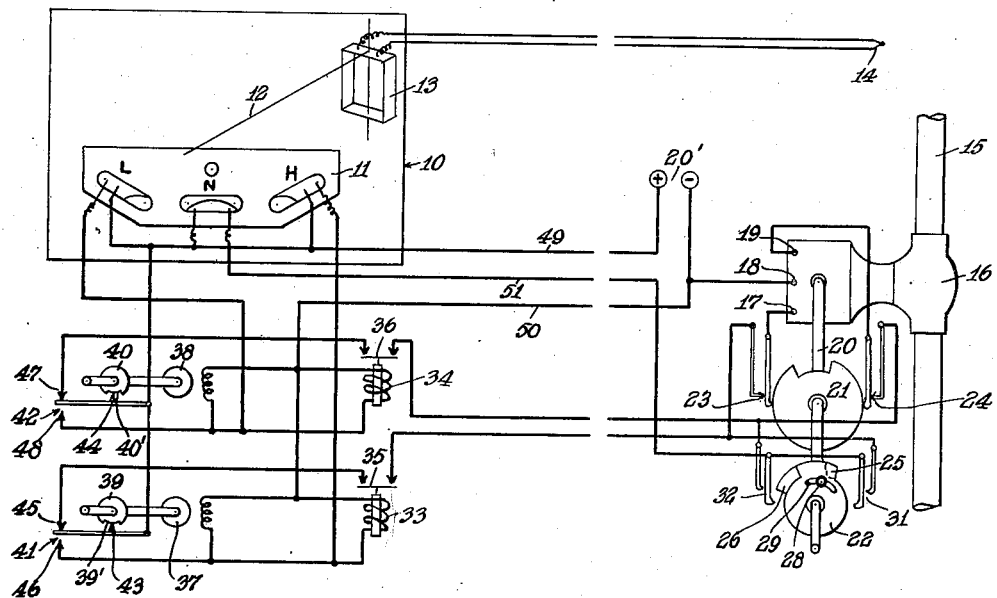
INVENTOR.
FREDERICK A. FAUST
BY
ATTORNEY.

Patented Aug. 30, 1938

2,128,406

UNITED STATES PATENT OFFICE 2,128,406

AUTOMATIC CONTROL SYSTEM

Frederick A. Faust, Waterbury, Conn., assignor to The Bristol Company, Waterbury, Conn., a corporation of Connecticut Application August 13, 1936, Serial No. 95,749

11 Claims. (Cl. 236—78)

This invention relates to automatic control systems, and more particularly to a system wherein a valve or other device for controlling the flow of fuel or other material is automatically adjusted through a range of positions in response to a demand for variations in rate of flow.

In the control of fuel-consuming apparatus and the like, particularly in those classes wherein the temperature response to a change in rate of fuel supply is characterized by a relatively great time lag, it is frequently found that under normal conditions effective control will be obtained with the valve or other regulating device automatically adjusted through a relatively limited range at more or less restricted speed, while under abnormal conditions it becomes desirable that the valve or other regulating device be carried beyond the limited operating range, and upon a return of conditions to normal be returned rapidly until again within the limited range of normal operation.

It is an object of the present invention to provide means whereby an automatically controlled valve or the like may operate within a relatively limited range and at a restricted speed under normal conditions, and upon the development of a demand for a greatly increased or decreased supply of the flowing material will extend its excursion through a wider range, and upon restoration of normal conditions will rapidly return to the limited, normal operating range.

A further object of the invention resides in the provision in such a system of interrupter means adapted to actuate a valve or the like in a series of impulses in response to a condition as established by a control instrument, and upon termination of said condition to revert to a position wherein upon reestablishment of a condition requiring interrupted action, there will at once be initiated an impulse of full duration before an interruption can occur.

These interrelated objects are accomplished in the invention hereinafter disclosed by providing on the operating mechanism of the valve or the like, in addition to the customary limit switch assembly, an auxiliary limit switch mechanism adapted to affect the control circuits within a relatively narrow and adjustable range of operation lying wholly within the extreme range of operation of the valve, and associating with the control circuits for the valve operating mechanism a motor-driven interrupter having a contact arrangement whereby a motor of the valve operating mechanism, once placed in operation, can come to rest only in the position which immediately precedes the initiation of an impulse in the control circuit.

The nature of the invention, however, will best be understood when described in connection with the accompanying drawing, in which:

Fig. 1 is a diagrammatic representation of a control system embodying the invention as applied to the control of an electrically operated valve.

Fig. 2 is a fragmentary enlarged view, partly in section, showing an element of the valve control mechanism.

Fig. 3 is a fragmentary elevation of an alternative control mechanism affording a reciprocating action in maintaining a variable rate of solid fuel feed as to a steam boiler, gas producer or the like.

Referring to the drawing, 10 designates a pyrometer-controller, preferably of the type set forth in U. S. Letters Patent #1,979,330, issued to applicant's assignee November 6, 1934, and having three mercury switches L, N and H, corresponding to "low", "neutral", and "high" positions, respectively.

These switches are carried on a common tiltable mounting plate 11, and are caused to complete their respective circuits through the agency of mechanism (not shown in the drawing) under command of a pointer 12 deflecting with a coil 13 in the field of a magnet (not shown) and in response to electromotive forces developed in a thermocouple 14, exposed to temperatures the nature of whose variation is an index to the required rate of fuel supply. The thermocouple 14 is connected to the coil 13 of the control instrument in such a manner that an increase in the temperature to which the couple is exposed will produce a deflection of the pointer 12 in a sense to cause the controller mechanism to tilt the plate 11 and close the circuit of mercury switch H. Similarly, a decrease of temperature will cause the switch L to be closed, while with the temperature standing at the control value for which the instrument is set, the pointer will assume a position wherein the table 11 is caused to revert to, and maintain, a position wherein H and L are both open and the switch N closed, as indicated in Fig. 1 of the drawing.

A pipe line 15, carrying a fluid medium, such as oil or a gaseous fuel to be controlled, has connected therein a valve 16, motor operated, the motor having three terminals 17, 18 and 19. The motor is adapted for reversible operation in a direction depending upon whether electric power is applied to the terminals 17 and 18 or the terminals 18 and 19. Associated with the mechanism, and positively geared to the valve proper, is a limit switch assembly including a shaft 20, having mounted thereon two limit cams 21 and 22.

The cam 21 normally maintains in a closed position two limit switches 23 and 24, one or other of these being opened as the valve approaches the corresponding extreme limit of its travel. These contacts are connected directly in series with the leads to terminals 17 and 19, respectively, so that the switches 23 and 24, as actuated by the cam 21, serve to perform the normal functions of a limit switch, power being derived from a suitable source of supply indicated at 20'.

The cam 22 is made up of two sectors 25 and 26, both mounted for independent limited angular adjustment on a hub 27, to which they may both be clamped by a screw 28, passing through an arcuate slot 29 in the sector 25 and a similar slot 29' in the flange of hub 27, and threaded into the sector 26. The hub 27 is definitely fixed to the shaft 20 by means of a set screw 30.

The sectors 25 and 26 overlap, and their outer edges subtend at the axis of rotation an adjustable angle always less than that subtended by the main limit cam 21, providing a narrower zone within the principal range of operation of the valve. Operatively associated with the cam 22 are two switches 31 and 32 arranged to be engaged by the cam sectors 25 and 26 respectively and in a sense to close their contacts when in said engagement, and to rest normally with their contacts open when not engaged by said sectors. Thus, between the principal limits of operation of the valve, as defined by the limit switches 23 and 24 in cooperation with the cam 21, is a narrower zone of operation defined by the switches 31 and 32 in cooperation with the cam sectors 25 and 26, respectively.

Included in the control circuits are two normally-open relays 33 and 34 having single-pole contacts 35 and 36, respectively, adapted to be closed when said relays are energized, and two small motors 37 and 38, preferably of the self-starting synchronous type commonly used in clocks and timing devices, adapted to drive cams 39 and 40, respectively. Each of these cams has a contour substantially circular in conformation and having therein a depressed notch 39' and 40', respectively, and subtending a small proportion of its circumference. Placed in operative engagement with the cams 39 and 40 are two single-pole double-throw snap switches 41 and 42, preferably of the type set forth in U. S. Letters Patent No. 1,960,020, issued May 22, 1934, to P. K. McGall. These switches are mechanically associated with said cams through followers 43 and 44, respectively, in such a manner that each switch is abruptly actuated as its follower enters or leaves the notch on the associated cam. The switch 41 includes a contact 45 closed only when the follower 43 is resting in the notch in cam 39 and a contact 46 closed only when the follower is in engagement with the circumference of the cam. The switch 42 includes a contact 47 closed only when the follower 44 is resting in the notch in cam 40 and a contact 48 closed only when the contact is in engagement with the cam. The angle subtended by each notch is so related to the speed of rotation of the cam and the operating cycle of the control instrument that the time required for the notch to travel its full extent is always less than that required for a complete cycle of the controller.

Designating the two sides of the electric supply circuit from the source 20' by "+" and "—", the connections of the control system are as follows: To the (+) side of the system are connected by a common conductor 49 the three mercury switches in the controller and also the common terminal of each of the switches 41 and 42. The operating coils of the relay 33 and motor 37 are connected in parallel, as are also the operating coils of relay 34 and motor 38, and one side of each of the circuits so formed is connected to the (—) side or conductor 50 of the supply, to which is connected also the common terminal 18 of the motor of valve 16. To the free side of the circuit formed by the coils of relay 33 and motor 37 is connected contact 46 of switch 41, and also the free terminal of the mercury switch H in the control instrument. To the free side of the circuit formed by the coils of relay 34 and motor 38 is connected the contact 48 of switch 42, and also the free terminal of mercury switch L in the control instrument. The free terminal of mercury switch N in the control instrument is connected to a common lead 51 joining one side of each of the limit switches 31 and 32. The free terminal of limit switch 31 is connected, in series with limit switch 23, to terminal 17 on the valve motor and also through contact 35 of the relay 33 to contact 45 of switch 41. The free terminal of limit switch 32 is connected, in series with limit switch 24, to terminal 19 of the valve motor, and also through contact 36 of relay 34 to contact 47 of switch 42.

The operation of the system may be described as follows: Assuming the valve mechanism to be in a position within the narrow inner operating zone, and the pointer of the control instrument in a position where the contacts of mercury switch N only are closed, the switches 31 and 32 will both be open, and no complete circuit will exist in the control system, so that the valve 16 will remain at rest.

Assuming now that the temperature rises, and the pointer 12 deflects to a position where the mercury switch H is closed and N opened, a circuit will be established through relay 33 and motor 37 in parallel. Contacts 35 will be closed, and at the same time motor 37 will start to rotate cam 39, through which the switch 41 is actuated. As long as follower 43 remains in the notch of the cam, contact 45 will be closed, completing a circuit from the (+) side of the circuit through contact 35 and limit switch 23 to terminal 17 of the valve motor, causing the valve 16 to operate in a sense to modify the rate of fuel supply and effect a consequent lowering of temperature at thermocouple 14. As the cam 39 continues to rotate, the follower 43 climbs to the outer periphery of the cam, causing simultaneous opening of contact 45 and closure of contact 46. The opening of contact 45 interrupts the current supply to the valve motor, bringing it to rest, while the contact 46 provides a shunt circuit around the mercury switch H, causing the relay 33 and the motor 37 to be maintained operative until the cam 39 has completed a revolution and the follower 43 has again entered the notch.

If, upon completion of this cycle, the mercury switch H in the controller is still found in a closed condition, indicating that the temperature has not been reduced, the cycle is repeated, and the valve motor given a further impulse; and this operation is repeated as long as the controller indicates too high a temperature, or until the limit of adjustment is reached as defined by the limit switch 23, and the latter opened by the cam 21.

In the event of the pointer 12 deflecting to a position representing a lowered temperature, and the switch H being opened, upon the follower 43 entering the notch in the cam 39, the contact 46 will open the circuit of relay 33 and motor 37; the contacts 35 will be opened, and the motor will come to rest with the contact 45 closed, in a position corresponding to the initiation of a further impulse whenever the relay and motor circuits are re-energized.

If the return of temperature to normal is effected while the valve is still in its inner operating zone, i. e., without the cam 22 having engaged the associated limit switches, the closing of mercury switch N as the plate 11 is tilted to its intermediate position, corresponding to a correct temperature value, will produce no operating effect, and the valve will remain at rest.

In the event of the temperature at the thermocouple 14 falling below its normal value, the switch L will be closed, and the operation will be identical with that set forth above, the valve being moved by impulses toward a position where the fuel supply will reach a rate tending to restore the temperature to the ideal value; and if that value is reached before the valve passes outside the inner operating zone, the valve will remain in the position occupied, as the controller reverts to neutral. Since the time of a cycle of operation of the control instrument is greater than the time the follower remains in the notch of the cam, the first impulse occurring after a change in setting of the controller must last through the full period as determined by the angle subtended by the notch in either cam 39 or 40.

In the event of the excursion of the valve in response to high temperature extending beyond its inner zone, the sector 26 of the cam 22 will engage and close the switch 32, which, so long as the mercury switch N remains open, will produce no effect on the operation. However, upon a return of the temperature to its normal value, and the closing of the switch N, current will flow from the (+) side of the circuit through limit switches 32 and 24 to the terminal 19 of the valve motor, causing it to return toward the inner operating zone without interruption, and without respect to the condition of the relays or contacting motors, until the edge of that zone is reached and the circuit is opened by the switch 32.

Upon an excursion of the valve toward the opposite extreme of its travel in response to low temperature causing the sector 25 to close the contact 31, and a subsequent return of the control instrument to its neutral position, the valve will be similarly actuated, and will return toward the inner zone of operation until the circuit is interrupted by the switch 31, and the valve comes to rest at the corresponding edge of the inner zone.

Thus, it will be seen that there has been provided means whereby a valve may be automatically actuated in impulses in either direction, while variations in the controlled magnitude are relatively small, said impulses becoming unidirectional as a predetermined operating zone is exceeded, with uninterrupted return to one or other limits of said zone immediately upon return of the controlled magnitude to its ideal value. In other words, when control conditions demand only small deviations of the valve within its intermediate zone, it moves with restricted speed and remains set when the controller returns to neutral, but when large deviations of the valve take place, a return of the controller to neutral causes the valve immediately to return to the nearest edge of the intermediate zone before attaining equilibrium.

It will also be apparent that whatever time in the cycle of alternate impulses and pauses of operation the control instrument may revert to neutral, subsequent demands for adjustment of flow as indicated by the controller will result in the initiation of an impulse immediately the mercury switch in the controller is closed. The independent adjustment of the two cam sectors 25 and 26 relatively to the shaft 20 makes it possible to adjust both the width of the inner operating zone and its position relative to the limits as established by the limit switches 23 and 24.

In Fig. 3 is shown an arrangement to which the type of control herein set forth is particularly suited, wherein the controlled motor, instead of directly operating a valve, serves to actuate a mechanism whereby the rate of feed of solid material such as coal or the like is regulated in response to the command of a control instrument. To this end, there is carried upon a stationary mounting member 60 a ratchet wheel 61, directly connected through its shaft 62, or otherwise operatively attached, to a screw feed, apron, or other stoking device (not shown) such as is commonly used in feeding solid fuel to a furnace or gas producer. The wheel is intermittently advanced in one direction by the action of a pawl 63 carried on an oscillatable arm 64 and engaging the toothed periphery of the wheel. A lever 65, swinging about a fixed axis 66 is oscillated through a constant angle by a link 67 connecting its extremity to a continuously rotating crank-arm 68. Slidably mounted on the lever 65 is a block 69, having thereon a bearing 70, which is connected to the swinging extremity of arm 64 by a link 71.

Journalled upon the lever 65, and rotatable about an axis perpendicular to the axis of oscillation of said lever, is an extended screw member 72 threadedly engaging a nut element 73 forming a part of the block 69, so that, as the screw is rotated about its axis, the block will be moved longitudinally of the lever 65, thus varying the angular deflection of arm 64 corresponding to the normal swing of lever 65. Fixed to the screw 72 is a worm wheel 72' meshing with a worm 74 mounted concentric with the axis 66 about which oscillates the lever 65. A gear 75, fixed to the worm 74, meshes with a pinion 76 on the shaft of a motor unit 77 embodying within its structure a limit switch assembly similar to that shown in Fig. 1. With this embodiment in association with a control system as above set forth, operation of the motor unit will act to vary the advance of the fuel-feeding mechanism in proportion to the continuous rotation of crank member 68, so that variations in temperature may be caused to produce a corrective action in the rate at which fuel is supplied to the furnace or gas producer or other device to which material is being fed.

The slowness of response which must necessarily characterize fuel-feeding devices of the ratchet type is not consistent with the rapid action essential for many types of temperature controllers; and it has been found that the performance of the control system set forth above is particularly well adapted to the control of such devices, particularly in the form in which they are employed in some forms of gas producers, where, under normal operating conditions, the cycle of operation should not be shorter than that corresponding to a revolution of the rotating grates, which time may be five minutes or more—this time interval being approximately represented in the control system by the time of one revolution of the cams 39, 40, operated by the synchronous motors.

At the same time, with a control system operating on a cycle of such relatively long duration, it is important, when the control instrument calls for an adjustment of the valve or other fuel-feeding device, that an impulse be initiated immediately upon closing of the switch in the controller, without waiting for an interrupter to reach a certain position in an independent cycle. Hence the importance of the interrupter always coming to rest in a position corresponding to the beginning of an impulse.

While the invention has been set forth in the specific application to regulating the supply of a fluid or solid fuel to a space wherein there takes place a reaction the intensity of which is reflected in a change of temperature, it is not the intention to limit the invention to this application, but to apply it in any case wherein the flow of a material is required to be controlled in response to variations of a magnitude whose value is a function of the rate of said flow.

I claim:

1. The combination with contact-making elements actuated respectively at low, neutral and high control points, a source of electrical power for the same, electrically controlled means operable, when the contacts of either the low or the high contact-making element are closed, for regulating the flow of a medium in accordance with the particular contact element actuated, and associated means for establishing lower and upper limits of operation of the electrically controlled means; of auxiliary means for establishing lower and upper limits of regulation of the electrically controlled means, operable within the range of the first-named limit-establishing means and only when the contacts of the neutral contact-making element are closed.

2. The combination with contact-making elements actuated respectively at low, neutral and high control points, a source of electrical power for the same, electrically controlled means operable, when the contacts of either the low or the high contact-making element are closed, for regulating the flow of a medium in accordance with the particular contact element actuated, and associated means for establishing lower and upper limits of operation of the electrically controlled means, including a switch embodying a lower limit contact and an upper limit contact, a relay-operated contact controlled by the low contact-making element and a relay-operated contact controlled by the high contact-making element, said relay-operated contact being in circuit with the respective upper limit contact and the lower limit contact; of auxiliary means for establishing lower and upper limits of regulation of the electrically controlled means and electrically connected to the respective lower and upper limit contacts and operable within the limits established by the same and only when the contacts of the neutral contact-making element are closed.

3. The combination with contact-making elements actuated respectively at low, neutral and high control points, a source of electrical power for the same, electrically controlled means operable, when the contacts of either the low or high contact-making element are closed, for regulating the flow of a medium in accordance with the particular contact element actuated, and associated means for establishing lower and upper limits of operation of the electrically controlled means, including a switch embodying a normally closed lower limit contact and a normally closed upper limit contact, a relay-operated contact controlled by the low contact-making element and a relay-operated contact controlled by the high contact-making element, said contacts being in circuit respectively with the upper and lower limit contacts; of auxiliary means for establishing lower and upper limits of regulation of the electrically controlled means and including a switch embodying a normally open lower limit contact and a normally open upper limit contact in circuit respectively with the first-named lower and upper limit contacts, said auxiliary means being operable within the limits established by the first-named limit-establishing means and only when the contacts of the neutral contact-making element are closed.

4. The combination with contact-making elements actuated respectively at low, neutral and high control points, a source of electrical power for the same, electrically controlled means operable, when the contacts of either the low or the high contact-making element are closed, for regulating the flow of a medium in accordance with the particular contact element actuated, and associated means for establishing lower and upper limits of operation of the electrically controlled means including a switch embodying a normally closed lower limit contact and a normally closed upper limit contact, a relay-operated contact and a motor-operated cam-controlled double-throw switch both controlled by the low contact-making element, a relay-operated contact and a motor-operated cam-controlled double-throw switch both controlled by the high contact-making element, the relay-controlled contacts being in circuit respectively with the upper and lower limit contacts together with one of the contacts of the respective double-throw switches, the other of whose contacts is adapted to shunt the corresponding contact-making element; of auxiliary means for establishing lower and upper limits of regulation of the electrically controlled means and including a switch embodying a normally open lower limit contact and a normally open upper limit contact in circuit respectively with the first-named lower and upper limit contacts, said auxiliary means being operable within the limits established by the first-named limit-establishing means and only when the contacts of the neutral contact-making element are closed.

5. The combination with contact-making elements actuated respectively at low, neutral and high control points, a source of electrical power for the same, electrically controlled means operable, when the contacts of either the low or the high contact-making element are closed, for regulating the flow of a medium in accordance with the particular contact element actuated, and associated means for establishing lower and upper limits of operation of the electrically controlled means; of auxiliary means for establishing lower and upper limits of regulation of the electrically controlled means, operable within the range of the first-named limit-establishing means and only when the contacts of the neutral contact-making element are closed, means associated with the limit-establishing means for interrupting periodically the controlling action of the electrically controlled regulating means as governed by both of said limit establishing-means, and means including the neutral contact-making element for rendering said interrupting means temporarily ineffective.

6. Automatic regulating means having two zones of operation, one zone lying wholly within the other, said regulating means including means for determining the limits of the outer zone, and a reversible motor member adapted for intermittent operation to effect said regulating action and to assume a plurality of positions of rest with respect to the outer of the two zones and corresponding to steady regulating conditions, means for determining the limits of the inner zone, an automatic instrument adapted to establish various control conditions for positioning through the energization of the motor said regulating means within said zones, interrupter means for causing said positioning action to be effected in a series of alternate impulses and pauses within said inner zone and within said outer zone while approaching the limits of the same, means associated with said inner-limit-determining means for bridging said impulse-producing means and eliminating said pauses in operation while said regulating means is returning from a position in said outer zone toward a position in said inner zone.

7. Automatic regulating means having two zones of operation, one zone lying wholly within the other, said regulating means including means for determining the limits of the outer zone, and a reversible motor member adapted for intermittent operation to effect said regulating action and to assume a plurality of positions of rest with respect to the outer of the two zones and corresponding to steady regulating conditions, means for determining the limits of the inner zone, an automatic instrument adapted to establish various control conditions for positioning through the energization of the motor said regulating means within said zones, interrupter means for causing said positioning action to be effected in a series of alternate impulses and pauses within said inner zone and within said outer zone while approaching the limits of the same, means associated with said inner-limit-determining means for bridging said impulse-producing means and eliminating said pauses in operation while said regulating means is returning from a position in said outer zone toward a position in said inner zone, said interrupter means including a member for bringing the same to rest in a position to establish a full impulse before the occurrence of a pause, upon the establishment of a control condition by said instrument.

8. In an automatic control system having a regulating device and an electric circuit for operating the same, interrupter switch means in said circuit for effecting control of said device in a series of impulses, an electric motor for actuating said interrupter switch means, further switch means comprising a part of said interrupter switch means and connected in the circuit of said motor to control the same, cam means whereby said motor actuates said switch means, said cam means having two portions adapted to engage operatively said switch means whereby to throw the same alternatively from a position in which said control is effected to a position in which said motor is maintained in operation, together with an automatic control instrument adapted to bridge said further switch means.

9. In a system for controlling a variable condition, having a control instrument, a condition-regulating device to be controlled thereby and an electric circuit operatively controlling the device: a double-throw switch, a cam to actuate the same, a motor for driving the cam whereby the switch is alternatively thrown from a position in which it operatively completes the circuit of said motor and interrupts said controlling circuit to a position in which it completes said controlling circuit and interrupts the circuit of said motor, said controller including contact means responsive to said condition for completing the circuit of said motor when the same is interrupted by said switching means.

10. In an automatic regulating system having a controller with extreme control positions and an intermediate position, a condition regulating device, and relays for governing the operation of said device under command of said controller: a timing motor, a quick-throw switch operated thereby and having two positions in one of which said motor is maintained in operation and in the other of which the circuit of said motor is opened and a circuit closed through the contacts of one of said relays for operating said regulating device, said controller in its two extreme positions serving to bridge said first contacts.

11. In combination, a control instrument having a low, a neutral, and a high control couple, and a motor-actuated device to be controlled thereby and having means for establishing a zone of operation intermediate between extreme high and extreme low limits for said device, means to restrict the speed of operation of said device when being operated within said intermediate zone and when being operated outside said zone in a sense to recede from said zone toward either of said extreme limits, together with means jointly subject to said neutral couple and said zone-establishing means for inhibiting said speed-restricting means and causing said device to return rapidly to the nearest limit of said intermediate zone upon activation of said neutral couple when said device is outside said intermediate zone.

FREDERICK A. FAUST.